United States Patent
Nookala et al.

[11] Patent Number: 5,878,257
[45] Date of Patent: Mar. 2, 1999

[54] SELF-BOOTING MECHANISM TO ALLOW DYNAMIC SYSTEM CONFIGURATION AND DIAGNOSTIC

[75] Inventors: Narasimha R. Nookala, San Jose; Kameswaran Sivamani, Sunnyvale; Otto Sponring, Los Altos, all of Calif.

[73] Assignee: Cirrus Logic, Inc., Fremont, Calif.

[21] Appl. No.: 749,876

[22] Filed: Nov. 15, 1996

[51] Int. Cl.$^6$ ....................................... C06F 9/06
[52] U.S. Cl. .................... 395/652; 395/200.51; 395/830; 395/653
[58] Field of Search .................... 395/651, 652, 395/653, 712, 830, 828, 200.52, 200.51, 200.5

[56] References Cited

U.S. PATENT DOCUMENTS

| | | | |
|---|---|---|---|
| 5,444,861 | 8/1995 | Adamec et al. | 395/712 |
| 5,623,604 | 4/1997 | Russell et al. | 395/712 |
| 5,630,139 | 5/1997 | Ozaki | 395/712 |
| 5,664,194 | 9/1997 | Paulson | 395/712 |

FOREIGN PATENT DOCUMENTS

| | | | |
|---|---|---|---|
| 0 489 204 A1 | 6/1992 | European Pat. Off. | G11C 16/06 |
| WO 96/02034 | 1/1996 | WIPO | G06F 9/06 |

*Primary Examiner*—Kevin A. Kreiss
*Attorney, Agent, or Firm*—Frank D. Nguyen; Victor H. Okumoto

[57] ABSTRACT

A mechanism to allow dynamic configurations and/or diagnostic of a computer system from a remote location is provided. The computer system receives instruction codes of a program from a data source. When executed by the CPU, the instruction codes performs the necessary erase and program operations to embed a firmware program onto to the flash memory. The firmware program can be used for configurations or diagnostic purpose.

18 Claims, 3 Drawing Sheets

SELF-BOOTING MECHANISM TO ALLOW DYNAMIC SYSTEM CONFIGURATION AND DIAGNOSTIC

FIELD OF THE INVENTION

The invention generally relates to computer systems, and more particularly relates to computer reconfiguration and diagnostic.

BACKGROUND OF THE INVENTION

In computer systems, firmware such as device drivers or other dedicated application programs are stored in erasable programmable read only memories (EPROM). EPROM are desirable for this task because they are nonvolatile (i.e., retain data stored to it when powered off) and they allow the stored firmware to be altered and/or upgraded as desired. However, any erasure of existing firmware and programming of new firmware can only be done with the EPROM removed from the board socket using special equipment.

Flash memory (i.e., solid state memory) is a new technology that is gaining support to replace EPROM because like EPROM, flash memory is nonvolatile. On the other hand, unlike EPROM, flash memory allows for in-system update ability under system processor control. Another difference between flash memory and other rewriteable memory technologies is that for flash memory, programming may only involve changing binary ones (1) to zeros (0) while erasing may only involve changing zeros back to ones which is the default binary value of memory cells in flash memory. As such, writing a firmware into a flash memory may require both an erasing and a programming operation. Discussion on flash memory technology can be found, for example, in Brian Dipert and Markus Levy, "Designing with Flash Memory" (2d ed. 1994) which is herein incorporated by reference as background material.

FIG. 1 illustrates a block diagram of Prior Art computer system 100 which allows firmware to be erased and reprogrammed under system processor control. As an example, the firmware may be a device driver needed to operate a peripheral device attached to computer system 100. The firmware can also be a diagnostic program needed to determine the existence of errors in the operation of computer system 100 and locate the source of these errors. Furthermore, the firmware can provide configuration parameters needed for the operation of computer system 100.

Computer system 100 consists of CPU 101, memory 102, flash memory 103, and floppy drive 104 which are all coupled to bus 105. With respect to erase operations, a program is retrieved from a floppy disk by floppy drive 104 and sent to memory 102 for storage. CPU 101 then executes the instructions codes stored in memory 102 to supply the desired voltage potentials across memory cells in flash memory 103 to carry out an erase operation. Similarly, in programming operations, a program is retrieved from a floppy disk by floppy drive 104 and sent to memory 102 for storage. CPU 101 then executes the instruction codes of the program stored in memory 102 to supply the desired voltage potentials across selective memory cells in flash memory 103 to program the firmware into flash memory 103.

Under the Prior Art, to program flash memory 103, a copy of the program must be available on site for the firmware to be programmed into flash memory 103. At best, a delay associated with shipping the program to the field may cause some inconveniences. At worst, such as the case involving a diagnostic program, a delay may halt usage of computer system 100 until the system error(s) can be detected and corrected.

Thus, a need exists for an arrangement, system, and method to allow firmware to be dynamically written into a programmable memory from a remote location.

SUMMARY OF THE INVENTION

Accordingly, the present invention provides an arrangement, system, and method to allow firmware to be dynamically written into a programmable memory from a remote location.

The present invention meets the above need with an apparatus to allow firmware to be dynamically written into a programmable memory from a remote location connected to a network. The apparatus comprises a processor, a parallel-to-serial converter, first memory, and a communications device.

The parallel-to-serial converter is coupled to the processor. The programmable memory is coupled to the processor. The first memory is coupled to the processor. The first memory stores instruction codes. When these instruction codes are executed by the processor, predetermined communications parameters are set for the parallel-to-serial converter.

The communications device is coupled to the parallel-to-serial converter. The communications device connects the arrangement to the network. Upon establishing such a connection, the communications device transfers instruction codes of a program from a data source at the remote location to the arrangement. Upon being executed by the processor, the program writes a firmware program into the programmable memory.

All the features and advantages of the present invention will become apparent from the following detailed description of its preferred embodiment whose description should be taken in conjunction with the accompanying drawings.

BRIEF DESCRIPTION OF THE DRAWINGS

Prior Art

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
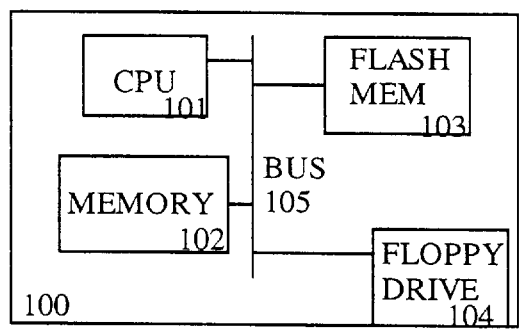
FIG. 1 is a block diagram illustrating a prior art computer system that allows firmware to be programmed into a flash memory that is part of the computer system.
Figure 2:
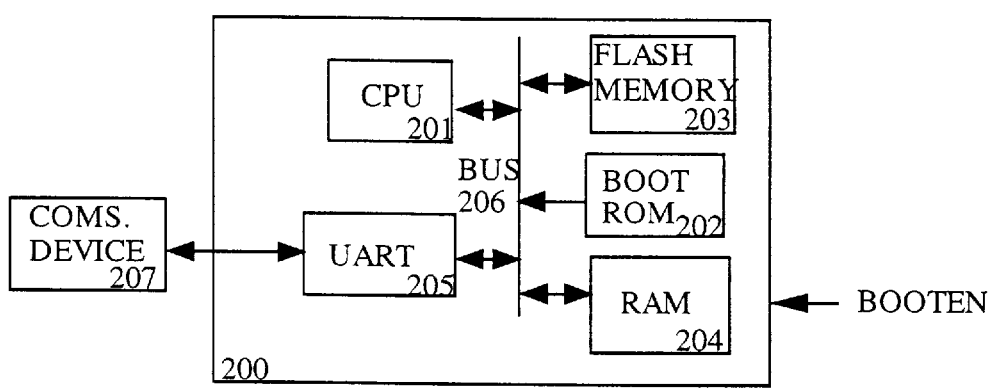
FIG. 2 is a block diagram illustrating a computer system in accordance with the present invention.

Reference is made to FIG. 2 illustrating a block diagram of computer system 200 in accordance with the present invention. Computer system 200 consists of central processing unit (CPU) 201, boot ROM 202, flash memory 203, RAM 204, and universal asynchronous receiver/transmitter (UART) 205 which are coupled together by bus 206. UART 205 is in turn coupled to communications device 207 which connects computer system 200 to communications network 208 not shown.

Boot ROM 202 stores the instruction codes used to initialize UART 205 and communications device 207. The instruction codes in boot ROM 202 are also used to retrieve a program from a remote data source connected to communications network 208. RAM 204 stores the program retrieved from the data source over the network 208. When executed by CPU 201, the program stored in RAM 204 carries out the necessary erasing and programming operations to write a firmware into flash memory 203. Data is transferred between CPU 201 and UART 205 as parallel data via system bus. Data transfer between UART 205 and communications device 207 is in serial form. Accordingly, UART 205 performs the serial-to-parallel and -parallel-to-serial data conversions necessary for data to be transferred to/from computer system 200. Communications device 207 transfers data between computer system 200 and other computers or devices over network 208. It should be clear to a person of ordinary skill in the art that communications device 207 can be any data communications circuit to interface with communications networks such as local area networks (LAN), wide area network (WAN), etc. In the preferred embodiment, communications device 207 is a modem.

Figure 3:
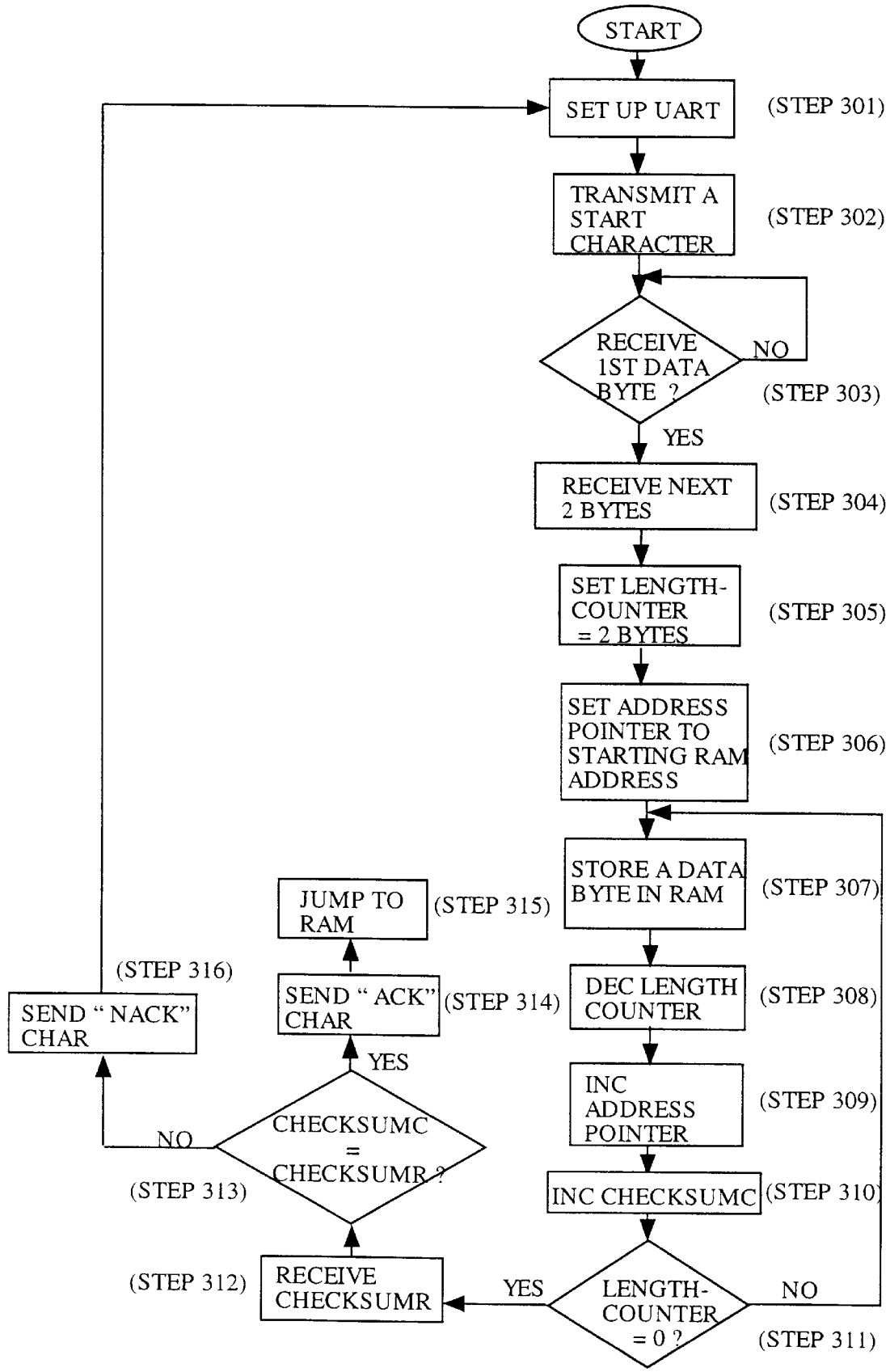
FIG. 3 is a flow chart of the instruction codes stored in the boot ROM shown in FIG. 2.

FIG. 3 illustrates a flow chart of the algorithm stored in boot ROM 202. As discussed earlier, the algorithm contains instruction codes to initialize UART 205 and communications device 207. Additionally, the algorithm contains instruction codes to retrieve a program used in writing a firmware into RAM 204 from a source connected to network 208.

In the preferred embodiment, CPU 201 of computer system 200 only executes the algorithm stored in ROM 202 when pin bootenable is asserted during power on reset. In step 301, UART 205 is initialized to operate with predetermined communications parameters. Preferably, UART 205 is set up to operate in a predefined protocol bps, bpc, and parity mode such as at a speed of 9600 bits per second, in 8-bit data characters, and with no parity bit. Step 301 may further include instruction codes to direct communication device 207 to directly establish communication with a data source connected to network 208. For example, communications device 207, which may be a modem, may be instructed to dial a telephone number to connect to a remote server.

Next, the algorithm sends a request to the data source to initiate the transmission of the program's instruction codes (step 302). When ready, the data source begins transmitting the program's instruction codes to computer system 200. In the preferred embodiment, it is established such that the 2 data bytes following the first data byte from the data source contains the byte count of the program instruction codes. As such, the algorithm in boot ROM 202 monitors the reception of the first data byte from the data source (step 303). The algorithm stays in a loop until the first data byte is received. After the first data byte is received, the algorithm monitors the reception of the next two data bytes (step 304). Next, counter length-counter is set to the data transfer byte count (step 305). In doing so, the byte count can be used to monitor the progress of the data transfer.

The data following the first three data bytes are the program's instruction codes. As such, the data following the first three data bytes are stored in RAM 204. Accordingly, CPU 201 sets its address pointer to the starting address of RAM 204 to store the next data byte in this memory location. In step 307, a data byte received from the data source is stored in the memory location having the address designated by the address pointer (step 307). Counter length-counter is then decremented by one to keep track of the number of program instruction data byte received (step 308). The content of the address pointer is then incremented to point to the next memory location in RAM 204 for storing the next data byte (step 309). The algorithm also computes a "checksum" to ensure that the data bytes received are error free. As such, each time a data byte of the program's instruction codes is received, the new "checksumc" is computed (step 310).

In step 311, the algorithm monitors the length-counter to determine whether all the data bytes associated with the program's instruction codes have been received. If the current value of the length-counter is greater than zero (0) indicating that there remain more data bytes associated with the program's instruction codes, the algorithm loops back to step 307 to continue receiving data bytes and storing them in RAM 204. Otherwise, if the current value of the length-counter is zero (0) indicating that all the data bytes have been received, the algorithm then receives the checksum value "checksumr" that is sent following the data bytes associated with the program's instruction codes. The checksum value "checksumr" is stored in a designated register (step 312).

The algorithm performs a redundancy check to ensure that all the data bytes slated for transmission have actually been received. To do so, the algorithm compares the computed value of "checksumc" with the received value of "checksumr" in step 313. It should be clear to a person of ordinary skill in the art that other redundancy check methods can also be used and are considered within the scope of the present invention.

If the computed value of "checksumc" is not equal to the received value of "checksumr" indicating that there is an error in the transmission, the algorithm sends a "NACK" character to signal the data source to redo the transmission (step 316). The algorithm starts over with step 301 again. If the computed value of "checksumc" equals the received value of checksumr indicating that the transmission is error free, the algorithm sends an "ACK" character to signal the data source that the transmission is complete (step 314). In this case, CPU 201 begins executing the program that now resides in RAM 204. The algorithm transfer control by jumping to the start of the program stored in RAM 204 (step 315).

The preferred embodiment of the present invention, an arrangement to allow firmware to be dynamically written into a programmable memory from a remote location, is thus described. While the present invention has been described in particular embodiments, the present invention should not be construed as limited by such embodiments, but rather construed according to the below claims.

What is claimed is:

1. An arrangement to allow firmware to be dynamically written into a programmable memory from a remote location connected to a network comprising:

a processor;

a parallel-to-serial converter coupled to the processor;

programmable memory coupled to the processor;

first memory coupled to the processor, the first memory storing boot instruction codes, the boot instruction codes executed by the processor following power on reset to initialize communications parameters for the parallel-to-serial converter; and a communications device coupled to the parallel-to-serial converter, the communications device connecting the arrangement to the network, the communications device transferring instruction codes of a program from a data source at the remote location to the arrangement, wherein when executed by the processor, the program causes the processor to write a firmware program into the programmable memory.

2. The arrangement of claim 1 further comprising second memory coupled to the processor, the second memory storing the instruction codes of the program.

3. The arrangement of claim 2, wherein the programmable memory being flash memory.

4. The arrangement of claim 2, wherein the first memory being read only memory.

5. The arrangement of claim 2, wherein the second memory being random access memory.

6. The arrangement of claim 2, wherein the communications device being a modem.

7. The arrangement of claim 2, wherein the operating parameters for the parallel-to-serial converter including a speed parameter of 9600 bits per second, a character data of 8 bits, and no parity.

8. The arrangement of claim 2, wherein when executed by the processor, the instruction codes stored in the first memory establishing communication with the data source.

9. The arrangement of claim 2, wherein when executed by the processor, the instruction codes stored in the first memory performing redundancy checking to ensure that data transferred is error free.

10. A computer system adapted to allow firmware to be dynamically written into a programmable memory from a remote location connected to a network comprising:

a bus;

a central processor connected to the bus;

a parallel-to-serial converter connected to the bus;

programmable memory connected to the bus;

first memory connected to the bus, the first memory storing boot instruction codes, the boot instruction codes executed by the central processor upon power on reset to initialize communications parameters for the parallel-to-serial converter; and a communications device coupled to the parallel-to-serial converter, the communications device connecting the computer system to the network, the communications device transferring instruction codes of a program from a data source at the remote location to the computer system, wherein when executed by the central processor, the program causes the central processor to write a firmware program into the programmable memory.

11. The computer system of claim 10 further comprising second memory coupled to the processor, the second memory storing the instruction codes of the program.

12. The computer system of claim 11, wherein the programmable memory being flash memory.

13. The computer system of claim 11, wherein the first memory being read only memory.

14. The computer system of claim 11, wherein the second memory being random access memory.

15. The computer system of claim 11, wherein the communications device being a modem.

16. The computer system of claim 11, wherein the operating parameters for the parallel-to-serial converter including a speed parameter of 9600 bits per second, a character data of 8 bits, and no parity.

17. The computer system of claim 11, wherein when executed by the processor, the instruction codes stored in the first memory establishing communication with the data source.

18. The computer system of claim 11, wherein when executed by the processor, the instruction codes stored in the first memory performing redundancy checking to ensure that data transferred is error free.

* * * * *